(12) United States Patent
Donald et al.

(10) Patent No.: US 7,835,504 B1
(45) Date of Patent: Nov. 16, 2010

(54) TELEPHONE NUMBER PARSING AND LINKING

(75) Inventors: Richard J. Donald, San Jose, CA (US); David J. Matiskella, Mountain View, CA (US)

(73) Assignee: Palm, Inc., Sunnyvale, CA (US)

( * ) Notice: Subject to any disclaimer, the term of this patent is extended or adjusted under 35 U.S.C. 154(b) by 1385 days.

(21) Appl. No.: 10/701,937

(22) Filed: Nov. 4, 2003

Related U.S. Application Data

(60) Provisional application No. 60/455,178, filed on Mar. 16, 2003, provisional application No. 60/479,392, filed on Jun. 17, 2003.

(51) Int. Cl.
*H04M 1/64* (2006.01)
*H04M 11/00* (2006.01)
*H04W 4/00* (2009.01)

(52) U.S. Cl. .............. 379/88.11; 379/88.13; 379/88.22; 455/466

(58) Field of Classification Search .............. 379/88.22, 379/88.13, 88.08, 88.11
See application file for complete search history.

(56) References Cited

U.S. PATENT DOCUMENTS

| | | | |
|---|---|---|---|
| 4,279,021 A | 7/1981 | See et al. | |
| 4,415,065 A | 11/1983 | Sandstedt | |
| 4,587,630 A | 5/1986 | Straton et al. | |
| 4,725,694 A | 2/1988 | Auer et al. | |
| 4,764,770 A | 8/1988 | Church | |
| 4,887,212 A | 12/1989 | Zamora et al. | |
| 4,892,981 A | 1/1990 | Soloway et al. | |
| 4,916,441 A | 4/1990 | Gombrich | |
| 5,010,547 A | 4/1991 | Johnson et al. | |
| D320,598 S | 10/1991 | Auerbach et al. | |
| 5,067,164 A | 11/1991 | Denker et al. | |
| 5,101,439 A | 3/1992 | Kiang | |

(Continued)

FOREIGN PATENT DOCUMENTS

| | | |
|---|---|---|
| EP | 0149762 A1 | 7/1986 |
| EP | 1104151 A2 | 5/2001 |

OTHER PUBLICATIONS

Screen Dumps of Microsoft Internet Explorer 6.0, 2001, pp. 1-13.

(Continued)

*Primary Examiner*—Joseph T Phan
(74) *Attorney, Agent, or Firm*—Fenwick & West LLP

(57) ABSTRACT

The present invention relates to identifying phone numbers in a text string including multiple data types and multiple number formatting types. A device such as a mobile device receives text strings from, for example, a memory, a networked content provider, another mobile device, or a keypad. A parsing engine comprises a telephone number module to analyze the text string by applying a set of parsing rules from a parsing rules database that describe telephone number characteristics. The parsing engine also comprises a non-telephone number module to identify non-telephone numbers such as an IP address, an email, a social security number, or the like. The parsing engine outputs parsing information including identified telephone numbers to a display application. The display application renders a user interface that displays the text string other than the telephone number in a first format and the telephone number in a second format including an activatable link.

41 Claims, 10 Drawing Sheets

---

You can reach me 4 comments at 555-7027 -- or by cell
1210
at (312) 555-8260 until
1220
7/28/2003. Alternatively, the comments will be posted on the we at 367.40.17 after 8112003.

Just type in my social security number, which is 333-78-1501.

1200

U.S. PATENT DOCUMENTS

| | | |
|---|---|---|
| 5,218,188 A | 6/1993 | Hanson |
| 5,227,614 A | 7/1993 | Danielson et al. |
| 5,334,824 A | 8/1994 | Martinez |
| 5,335,276 A | 8/1994 | Thompson et al. |
| 5,336,001 A | 8/1994 | Lichtenberg |
| 5,345,516 A | 9/1994 | Boyer et al. |
| 5,357,065 A | 10/1994 | Mitamura et al. |
| 5,359,317 A | 10/1994 | Gomez et al. |
| 5,379,057 A | 1/1995 | Clough et al. |
| 5,392,447 A | 2/1995 | Schlack et al. |
| D359,920 S | 7/1995 | Sakamoto |
| 5,430,436 A | 7/1995 | Fennell |
| 5,465,401 A | 11/1995 | Thompson |
| 5,494,363 A | 2/1996 | Hochgesang |
| 5,503,484 A | 4/1996 | Louis |
| 5,650,776 A | 7/1997 | Mitchell et al. |
| 5,705,995 A | 1/1998 | Laflin et al. |
| 5,742,894 A | 4/1998 | Jambhekar et al. |
| 5,779,030 A | 7/1998 | Ikegami et al. |
| 5,812,651 A | 9/1998 | Kaplan |
| 5,813,778 A | 9/1998 | Shih |
| 5,903,852 A | 5/1999 | Schaupp, Jr. et al. |
| 5,905,863 A | 5/1999 | Knowles et al. |
| 5,917,906 A | 6/1999 | Thornton |
| 5,936,614 A | 8/1999 | An et al. |
| 5,941,648 A | 8/1999 | Robinson et al. |
| 5,966,652 A * | 10/1999 | Coad et al. ............... 455/412.1 |
| D416,256 S | 11/1999 | Griffin et al. |
| 6,038,547 A | 3/2000 | Casto |
| 6,058,304 A | 5/2000 | Callaghan et al. |
| 6,101,531 A | 8/2000 | Eggleston et al. |
| 6,151,507 A | 11/2000 | Laiho et al. |
| 6,157,630 A | 12/2000 | Adler et al. |
| 6,166,342 A | 12/2000 | Chou |
| 6,198,053 B1 | 3/2001 | Chou |
| 6,226,362 B1 | 5/2001 | Gerszberg et al. |
| 6,230,197 B1 | 5/2001 | Beck et al. |
| 6,256,631 B1 | 7/2001 | Malcolm |
| 6,259,931 B1 | 7/2001 | Singh |
| 6,278,442 B1 | 8/2001 | Griffin et al. |
| 6,289,226 B1 * | 9/2001 | Lekven et al. ............... 455/566 |
| 6,295,372 B1 | 9/2001 | Hawkins et al. |
| 6,310,609 B1 | 10/2001 | Morgenthaler |
| 6,333,973 B1 | 12/2001 | Smith et al. |
| 6,346,952 B1 | 2/2002 | Shtivelman |
| D454,349 S | 3/2002 | Makidera et al. |
| 6,363,349 B1 | 3/2002 | Urs et al. |
| 6,370,018 B1 | 4/2002 | Miller et al. |
| D456,794 S | 5/2002 | Laverick et al. |
| 6,396,482 B1 | 5/2002 | Griffin et al. |
| 6,415,138 B2 | 7/2002 | Sirola et al. |
| D462,354 S | 9/2002 | Kimbre et al. |
| 6,452,588 B2 | 9/2002 | Griffin et al. |
| D464,962 S | 10/2002 | MacGregor et al. |
| 6,489,950 B1 | 12/2002 | Griffin et al. |
| D468,714 S | 1/2003 | Maruska et al. |
| D469,749 S | 2/2003 | Kim |
| D470,842 S | 2/2003 | Bhatia et al. |
| 6,516,202 B1 | 2/2003 | Hawkins et al. |
| D471,559 S | 3/2003 | De Saulles |
| D477,597 S | 7/2003 | Laverick et al. |
| 6,611,254 B1 | 8/2003 | Griffin et al. |
| 6,611,255 B2 | 8/2003 | Griffin et al. |
| 6,630,944 B1 | 10/2003 | Kakuta et al. |
| 6,690,931 B2 * | 2/2004 | Heo ............... 455/414.1 |
| D488,478 S | 4/2004 | Laverick et al. |
| 6,799,033 B2 | 9/2004 | Kanefsky |
| 6,834,048 B1 * | 12/2004 | Cho et al. ............... 370/356 |
| 6,867,763 B2 | 3/2005 | Griffin et al. |
| 6,870,828 B1 * | 3/2005 | Giordano, III ............... 370/352 |
| 6,873,317 B1 | 3/2005 | Griffin et al. |
| 6,891,529 B2 | 5/2005 | Ladouceur et al. |
| 6,919,879 B2 | 7/2005 | Griffin et al. |
| 6,938,067 B2 * | 8/2005 | Hershenson ............... 709/202 |
| 6,941,134 B2 | 9/2005 | White |
| 6,981,223 B2 | 12/2005 | Becker et al. |
| 7,003,305 B2 * | 2/2006 | Urs ............... 455/466 |
| 7,007,239 B1 | 2/2006 | Hawkins et al. |
| D518,820 S | 4/2006 | Hawkins et al. |
| D518,825 S | 4/2006 | Hawkins et al. |
| D519,502 S | 4/2006 | Hawkins et al. |
| 7,028,263 B2 | 4/2006 | Maguire |
| 7,050,551 B2 * | 5/2006 | Beith et al. ............... 379/88.14 |
| 7,054,441 B2 | 5/2006 | Pletikosa |
| 7,061,403 B2 | 6/2006 | Fux |
| 7,103,010 B2 | 9/2006 | Melideo |
| 7,103,348 B1 * | 9/2006 | Levit et al. ............... 455/412.1 |
| 7,103,388 B2 | 9/2006 | Scott |
| 7,266,584 B2 | 9/2007 | Mullen et al. |
| RE40,998 E * | 11/2009 | Cho et al. ............... 370/356 |
| 2001/0006889 A1 | 7/2001 | Kraft |
| 2001/0021649 A1 | 9/2001 | Kinnunen et al. |
| 2001/0025309 A1 | 9/2001 | Beck et al. |
| 2002/0019243 A1 | 2/2002 | Zhang et al. |
| 2002/0044136 A1 | 4/2002 | Griffin et al. |
| 2002/0044138 A1 | 4/2002 | Griffin et al. |
| 2002/0069218 A1 | 6/2002 | Sull et al. |
| 2002/0115476 A1 | 8/2002 | Padawer et al. |
| 2002/0147614 A1 | 10/2002 | Doerr et al. |
| 2002/0190957 A1 | 12/2002 | Lee et al. |
| 2003/0005048 A1 | 1/2003 | Risalvato |
| 2003/0065788 A1 | 4/2003 | Salomaki |
| 2003/0114174 A1 * | 6/2003 | Walsh et al. ............... 455/466 |
| 2003/0235275 A1 * | 12/2003 | Beith et al. ............... 379/67.1 |
| 2004/0137884 A1 | 7/2004 | Engstrom et al. |
| 2004/0166829 A1 | 8/2004 | Nakae et al. |
| 2004/0185883 A1 | 9/2004 | Rukman |
| 2004/0218609 A1 | 11/2004 | Foster et al. |
| 2004/0233159 A1 | 11/2004 | Badarneh |
| 2004/0239639 A1 | 12/2004 | Stavely et al. |
| 2005/0097189 A1 * | 5/2005 | Kashi ............... 709/217 |
| 2006/0034434 A1 * | 2/2006 | Kashi ............... 379/93.07 |
| 2009/0141709 A1 * | 6/2009 | Cho et al. ............... 370/352 |

OTHER PUBLICATIONS

"3GPP2 Multimedia Messaging System—MMS Specification Overview—Revision: A" [online], May 2003, Mobile Messaging, [retrieved on Dec. 10, 2004]. Retrieved from the Internet: <URL:http://www.lebodic.net/left.htm.

"An Introduction to Mobile Messaging" [online], May 2003, Mobile Messaging, [retrieved on Dec. 10, 2004]. Retrieved from the Internet: <URL:http://www.lebodic.net/intro.htm.

*American Programmer*, N.Y., American Programmer, Inc. (Dec. 1991), pp. 4-33.

*At Last, Technology Harnesse [sic] One of the Most Powerf [sic] Forces known to Man.*, Foster City, GO Corporation, 1991, 14 pages.

AT&T New Release, *NCR Cuts Price of 3170 Notebook Computer 11 to 19 Percent* [online]. (Mar. 8, 1993), Retrieved from the Internet: <URL:http://www.att.com/press/0393/930308.nca.htm> 2 pages.

Carr, R.M., *The Point of the Pen, Byte* (Feb. 1991, Reprinted), 10 pages.

Cullen, A., *Connecting With Your EO Cellular Module*, Mountain View, EO, Inc., 1992, 1993, pp. ii-33.

Cullen, A., *Getting Started With Your EO Personal Communicator*, Mountain View, EO, Inc., 1992, 1993, pp. ii-74.

Cullen, A., *Lookup Guide to the EO Personal Communicator*, Mountain View, EO, Inc., 1992, 1993, pp. ii-320.

*IBM Selects Racotek Data/Voice Communications Services to Interface With Touchmobile Product*, PR Newswire (Jan. 25, 1993), 2 pages.

*IBM TouchMobile Information and Planning Guide, International Business Machines Incorporated* (Mar. 1993), 20 pages.
*IBM TouchMobile Solution for Data Capture and Communication, Keeping Your Business Moving in the 90s, International Business Machines Incorporated* (Jan. 1993), 13 pages.
*IBM'S Touchmobile Helps Field Workers Collect Data at the Touch of a Finger*, PR Newswire (Jan. 26, 1993), 2 pages.
MacNeill, D., *Messaging Card and NewtonMail: We Pick Up and Deliver*, On The Go Magazine [online]. (Oct. 13, 1993), Retrieved from the Internet: <URL:http://www.pencomputing.com/Newton/NewtonNotes2.html> 2 pages.
MacNeill, D., *Wireless Newton Technology Goes to Work, On The Go Magazine* [online]. (Sep. 8, 1993), Retrieved from the Internet: <URL:http://www.pencomputing.com/Newton/NewtonNotes1.html >2 pages.
Maki, K., *The AT&T EO Travel Guide*, N.Y., John Wiley & Sons, Inc., 1993, pp. iii-555.
Schlender, B. R., *Hot New PCs That Read Your Writing, Fortune* (Feb. 11, 1991, Reprinted), 6 pp.
Stock, R., *The World of Messaging An Introduction to Personal Communications*, Mountain View, EO, Inc., 1992, 1993, pp. ii-69.

Toshiba Computer Systems Group (http://www.toshiba.com) May 28, 2002.
Toshiba Computer Systems Group: Pocket PC e570 (http://www.pda.toshiba.com) Jul. 7, 2001.
Hewlett Packard, Products and services, (http://www.hp.com/) Nov. 11, 2001.
T-Mobile Products; Handhelds (http://www.tmobile.com) Sep. 28, 2002.
T-Mobile Products; Sidekick (http//www.tmobile.com) Sep. 28, 2002.
Nokia Introduces Mobile Chat With Nokia 3310. [online], Sep. 1, 2000. [retrieved on Nov. 17, 2003]. <http://www.mobiletechnews.com/info/2000/09/01/142022.htm>.
Nokia, Frequently Asked Questions;[online], [retrieved on Nov. 17, 2003], <http://www.nokia.co.in/nokia_apac/india/faqs_list/0,18778,39_41.00.html>.
Aiken et al., "Microsoft Computer Dictionary," Microsoft Press, Fifth Edition, p. 523, May 2002.

\* cited by examiner

You can reach me 4 comments at 555-7027 -- or by cell at (312) 555-8260 until 7/28/2003. Alternatively, the comments will be posted on the we at 367.40.17 after 8112003. Just type in my social security number, which is 333-78-1501.

You can reach me 4 comments
1010
at 555-7027 -- or by cell
1020
at (312) 555-8260 until
1030
7/28/2003. Alternatively, the
1040
comments will be posted on the we at 367.40.17 after 8112003
1050          1060
Just type in my social security number, which is 333-78-1501
1070

You can reach me 4 comments at <u>*555-7027*</u> -- or by cell
1210
at <u>*(312) 555-8260*</u> until
1220
7/28/2003. Alternatively, the comments will be posted on the we at 367.40.17 after 8112003.

Just type in my social security number, which is 333-78-1501.

TELEPHONE NUMBER PARSING AND LINKING

CROSS REFERENCE TO RELATED APPLICATIONS

This application is related to U.S. Provisional Patent Application Nos. 60/455,178, filed on Mar. 16, 2003, entitled "Handheld PDA, Telephone, and Camera," and 60/479,392, filed on Jun. 17, 2003, entitled "Communicator" from which priority is claimed under 35 U.S.C. §119(e) and which applications are incorporated by reference herein in their entirety.

BACKGROUND OF THE INVENTION

1. Field of the Invention

This invention relates generally to parsing a text string and, more specifically, to identifying a telephone number within the text string.

2. Description of Related Art

An emerging mobile device combines the functionality of a PDA (Personal Desktop Assistant) and cellular telephone. Conventional cellular telephone applications only had to facilitate telephone numbers entered into pre-defined fields. On the other hand, applications for these mobile devices make use of more robust data processing to provide numerous functionalities in addition to dialing telephone numbers.

One problem with handling multiple data types is how to accurately identify telephone numbers within the data. Telephone numbers appear in a text string with varying formats and spacing, and often are not accompanied by an embedded identifier. Furthermore, there are multiple types of similar number structures that are not telephone numbers such as IP addresses, dates, and other number formats that resemble telephone numbers. Consequently, applications attempting to identify telephone numbers often generate false positives.

A related problem in identifying telephone numbers is that many different number formats exist, particularly for international phone numbers. Some international telephone numbers can also include several combinations of characters other than numbers. Often, it is difficult to even ascertain where a phone number begins and ends.

Another problem is that different applications have varying tolerance levels for recognizing telephone numbers. An application such as a web browser is likely to display text strings from a content provider that adheres more closely to conventional formatting. However, an application such as SMS (Short Message Service) receives telephone numbers in SMS messages that are authored by individuals using less formality. These varying levels of formality are not well addressed by a single set of rules without flexibility. On one hand, low tolerance rules in an informal environment such as SMS messaging will miss many telephone numbers and cause inconvenience to the user. On the other hand, high tolerance rules in a formal environment will similarly inconvenience the user with many false positives.

What is needed is a robust parsing application that solves the above problems in identifying telephone numbers. The solution should identify telephone numbers within a text string that can contain other text, multiple data types, and/or multiple number formatting types. The solution should also provide flexibility with varying tolerance levels.

SUMMARY OF THE INVENTION

The present invention relates to identifying phone numbers within a text string including multiple data types and multiple number formatting types. As a result, when embodied in a mobile device, for example, a user interface can display telephone numbers in a conspicuous format along with an activatable link. The mobile device receives text strings from, for example, a memory, a networked content provider, another mobile device, or a keypad. A parsing engine applies a set of parsing rules from a parsing rules database that describe telephone number characteristics. The parsing engine outputs parsing information, including identified telephone numbers, to a display application such as a web browser, SMS application, or the like. The display application renders the user interface that displays the text string in a first format and the telephone number in a second format.

In one embodiment, the parsing engine comprises a delimiter module to identify potential telephone numbers from the text string based on formatting characters such as spaces, parentheses, and periods. The parsing engine also comprises a telephone number module to identify telephone numbers based on a set of telephone number rules that describe telephone number characteristics. The parsing engine may furthermore comprise a non-telephone number module to identify non-telephone numbers such as an IP address, an email, a social security number, or the like.

In another embodiment, the parsing rules comprise Boolean logic that provides deterministic outcomes to an analyzed text string. The telephone number parsing rules comprise, for example, local telephone number rules, national telephone number rules, and/or international telephone number rules. The local telephone number rules may primarily comprise zero or one formatting characters; the national telephone number rules may comprise three formatting characters, and also describe sequential orders and allowable combinations; and the international telephone number rules may comprise three or more formatting characters, and address additional types of formatting characters present in international telephone numbers.

In yet another embodiment, the display application indicates the tolerance level for identification accuracy as high, low, mixed, or otherwise. In a low tolerance mode, the parsing module requires a higher threshold for identifying a telephone number compared to the high tolerance mode. The parsing module may accumulate a reliability score associated with each rule in assessing whether the threshold has been met.

In still another embodiment, the parsing module requests verification of a potential telephone number that is indeterminate. Preferably, in low tolerance mode, the parsing module requests verification for potential telephone numbers that would fail in low tolerance mode, but pass in high tolerance mode. The parsing module generates a new rule in response to verified potential telephone numbers.

Advantageously, the present invention improves usability by accurately identifying telephone numbers within text strings having multiple data types, number types, and telephone number formats.

BRIEF DESCRIPTION OF THE FIGURES

FIG. 1 is an illustration of a user interface before processing that includes a text string with unidentified telephone numbers.

FIG. 2 is an illustration of the user interface of FIG. 1 during processing that includes a text string with potential telephone numbers according to one embodiment of the present invention.

FIG. 3 is an illustration of the user interface of FIG. 2 after processing that includes a text string with identified telephone numbers according to one embodiment of the present invention.

DETAILED DESCRIPTIONS OF THE PREFERRED EMBODIMENTS

Figure 4:
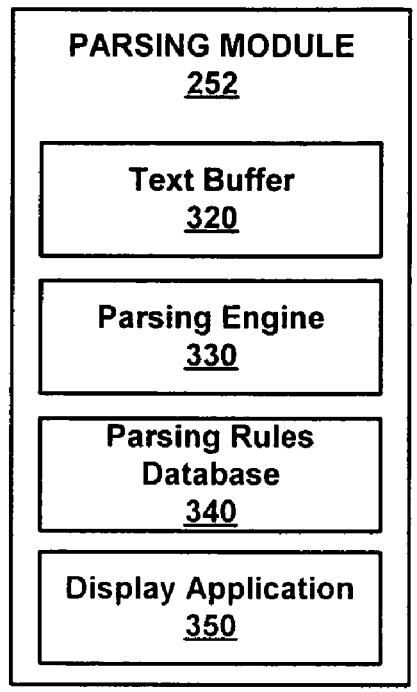
FIG. 4 is a functional block diagram illustrating the parsing module according to one embodiment of the present invention.

One of ordinary skill in the art will undoubtedly appreciate that the present invention can be practiced without some specific details described herein, and indeed will see that many other variations and embodiments of the invention can be practiced while still satisfying the teachings of the invention. For example, the present invention may be embodied in a mobile device as described below, but also a PC, or any other device that displays text strings containing telephone numbers in the context of messages, application data, web content, or otherwise.

In general, the present invention relates to identifying phone numbers within a text string including multiple data types and multiple number formatting types. As a result, when embodied in a mobile device, for example, a user interface can display telephone numbers in a conspicuous format along with an activatable link.

FIG. 1 is an illustration of a user interface 800 before processing that includes a text string with unidentified telephone numbers. The user interface 800 is presented to a user through an LCD, plasma, CRT, or any other display device as described further below. The text string may be a text message, e-mail content, web page content, or otherwise. The text string may be composed of one or many display character such as ASCII characters. The display characters include letters A through Z, numbers 0 through 9, symbols, etc. In one embodiment, the user enters a text string. In another embodiment, the text string originates from a data file displayed to the user. Note also that processed text strings may be displayed without identifying telephone numbers within, when the rules fail.

FIG. 2 is an illustration of the user interface 1000 of FIG. 1 during processing that includes a text string with potential telephone numbers according to one embodiment of the present invention. In one embodiment, processing of user entered data is triggered either during data entry or after data has been submitted. Processing of received data is triggered prior to display. As shown in FIG. 2, portions of the text string 1010-1070 are processed and identified as potential telephone numbers according to rules as described below. Furthermore, potential telephone numbers 1040, 1050, 1060 are positively identified as non-telephone numbers by identifying them as a date, an IP address, and a date respectively, thereby disqualifying them as telephone numbers. Note that FIG. 2 is presented for illustrative purposes since it is not necessary to display intermediate steps during processing to practice the current invention. Methods for positively identifying non-telephone numbers are also discussed in detail below.

FIG. 3 is an illustration of the user interface 1200 of FIG. 2 after processing that includes a text string with identified telephone numbers according to one embodiment of the present invention. Potential telephone number 1210 is positively identified as a local telephone number by satisfying a rule composed as <space><three nos.><dash><four nos.><space>, and potential telephone number 1220 is positively identified as a national telephone number by satisfying the rule composed as <space><parentheses><three digits in parentheses><space><three nos.><dash><four nos.><space>. Potential telephone numbers 1010 and 1070 failed the telephone number rules because they do not have the requisite amount of numbers. In one embodiment, potential telephone number 1010 would fail the delimiter rules and thus not be examined as a potential telephone number. Methods for positively identifying telephone numbers are discussed in detail below. Portions of text containing telephone numbers 1210, 1220 are formatted with a bold, indented, and underlined font to indicate activatable telephone number links. The user may activate these links to, for example, dial the telephone number, save the number to a contact list, send an SMS message, or the like.

FIG. 4 is a functional block diagram illustrating the parsing module 252 according to one embodiment of the present invention. The parsing module 252 analyzes text strings to identify the telephone numbers contained in the text string and output the identified telephone numbers to the user interface. The parsing module 252 is coupled to receive text strings from within the mobile device as described below in FIG. 11, or from outside the mobile device as described below in FIG. 12. The parsing module 252 may be implemented in software executed in hardware as described below in FIG. 11, implemented primarily in hardware, or otherwise.

The parsing module 252 comprises a text string buffer 320, a parsing engine 330, a passing rules database 340, and a display application 350. An operating system such as Palm OS 5 by Palm, Inc. of Milpitas, Calif. or Microsoft CE by Microsoft Corporation of Redmond, Wash., or any other message passing operating system that facilitates interoperability between hardware and software, and inter-process communication in the parsing module 252. The text buffer 320 temporarily stores text strings before, during, and/or after processing by the parsing engine 330.

The parsing engine 330 analyzes text strings by applying parsing rules to identify telephone numbers within the text strings. The parsing engine 330 may receive a signal from the operating system or the text buffer 320 when a text string is ready for analysis. At this point, the text string may be completely or only partially entered. Based on the analysis, the parsing engine 330 sends parsing information to the display application 350. Methods related to the parsing engine 330 are discussed in more detail below.

The parsing rules database 340 stores parsing rules that indicate characteristics of text strings. The parsing rules may be organized into subsets of rules, for example, for identifying potential telephone numbers, for positively identifying telephone numbers, for positively identifying non-telephone numbers, and the like. The parsing rules may comprise Boolean logic to text strings or portions of text strings and output either a true or false. The parsing rules may be predetermined or adapted to user configurations. In one embodiment, the parsing rules include reliability weights and mode indicators to facilitate selection by the parsing engine 330 responsive to the display application's 350 requirements. The parsing rules database 340 may receive an accuracy mode, a query, a sorting instruction or a specific rule request from the parsing engine 330. The parsing rules database 340 is described in more detail below with respect to FIG. 6.

The display application 350 provides a user interface including identified telephone numbers to a display. The display application 350 receives parsing information that identifies telephone numbers within text strings. In one embodiment, the parsing information includes the accumulated rule score. The display application 350 renders the user interface to identify telephone numbers to the user. For example, telephone numbers may have a distinct appearance in font size, color, type or other attributes. The display application may comprise, or example, a web browser, an SMS (Short Message Service) application, an e-mail application, a word processor, a spreadsheet, a telephone book, or any other application capable of displaying text strings.

Figure 5:
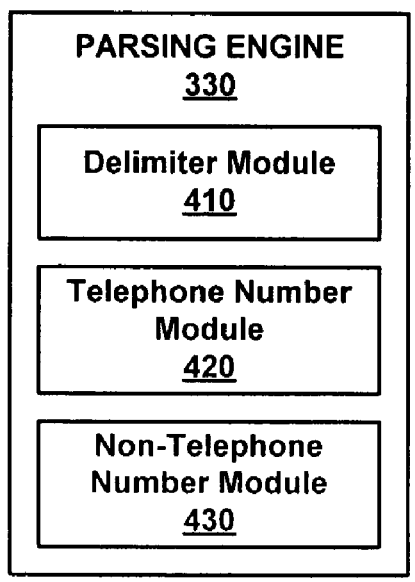
FIG. 5 is a functional block diagram illustrating the parsing engine according to one embodiment of the present invention.
Figure 6:
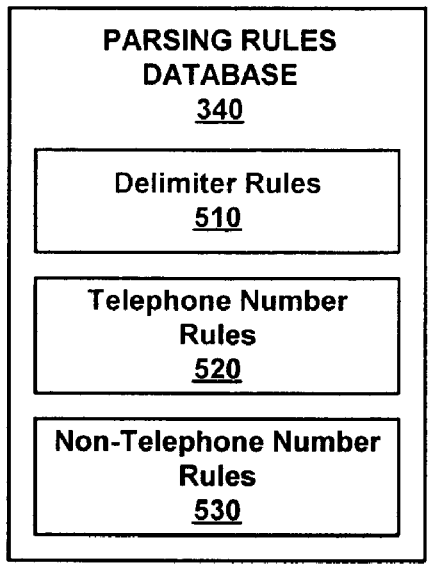
FIG. 6 is a functional block diagram illustrating the parsing rules database according to one embodiment of the present invention.

FIG. 5 is a functional block diagram illustrating the parsing engine 330 according to one embodiment of the present invention. The parsing engine 330 comprises a delimiter module 410, a telephone number module 420, and a non-telephone number module 430. FIG. 6 is a functional block diagram illustrating the parsing rules database according to one embodiment of the present invention. The parsing rules database 340 comprises delimiter rules 510, telephone number rules 520, and non-telephone number rules 530.

The delimiter module 410 identifies potential telephone numbers from portions of text strings marked by applying a set of delimiter rules 510. The delimiter module 410 scans text strings for indications of discrete portions or boundaries of text that include sequential numbers. In one embodiment, the delimiter rules 510 require a minimum amount of numbers such as seven. For example, discrete portions of text may be indicated by delimiting characters such as a space (' '), an asterisk ('*'), a pound sign ('#'), a parenthesis ('(' or ')'), a dash ('-'), a slash ('/'), a backslash ('\'), a colon (':'), a semi-colon (';'), a period ('.'), or the like. The delimiter module 410 may re-scan text strings to identify additional potential telephone numbers that have overlapping portions of text strings. For example, in a first scan, the delimiter module 410 may identify the text string portion between parentheses; and in a second scan, identify the text string portion including and to the right of parentheses. Methods related to the delimiter module 410 and are discussed in more detail below. As described above, FIG. 2 illustrates a user interface with potential telephone numbers.

Figure 7:
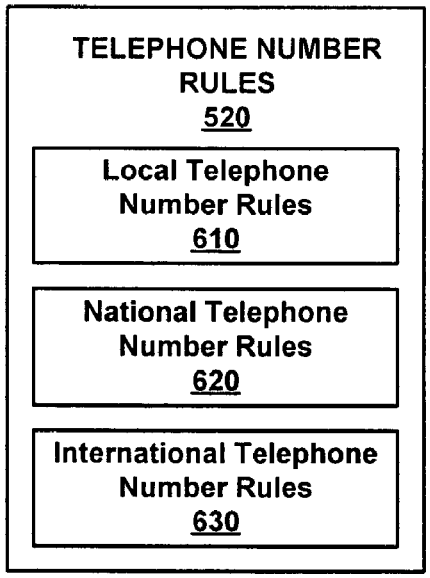
FIG. 7 is a functional block diagram illustrating the telephone number rules according to one embodiment of the present invention.

The telephone number module 420 applies a set of telephone number rules 520 to determine if the potential telephone number can be positively identified. The telephone numbers are positively identified as local, national, or international. In doing so, the telephone number module 420 invokes telephone number rules 520 to analyze single delimiters and delimiter combinations of two or more. FIG. 7 is a functional block diagram illustrating the telephone number rules according to one embodiment of the present invention. In one embodiment, the telephone number rules database 520 comprises a set of local telephone number rules 610, a set of national telephone number rules 620, and a set of international telephone number rules 630.

The set of local telephone number rules 610 determine whether a text string portion under analysis exhibits local telephone number characteristics. Generally, the local telephone number is a sequence of seven sequential numbers that includes zero or one format characters. Table 1 lists example telephone number formats that, when analyzed under the local telephone number rules 610, yield a positive result. Note that in some areas, ten digit dialing is used for local numbers. Accordingly, a sub-set of local telephone number rules or national telephone number rules 620 describe telephone number formatting characteristics in this case.

An exemplary rule that implements the dash format character may be composed as <three nos.><dash><four nos.> which indicates a positive telephone number with a sequence of three numbers, a dash, and four numbers. A related rule may go further to indicate that the above rule is preceded and followed by spaces and/or non-number characters, e.g., <non-nos.><space><three nos.><dash><four nos.><space><non-nos.>. This ensures that no other numbers were intended be part of the telephone number. Yet another rule may specify that if followed by a period and space, the text string portion is a telephone number, e.g., <three nos.><dash><four nos.><period><space>. Still another set of rules identifies telephone numbers embedded in text without spaces, such as '(home)230-5000(after 5 pm).'

In one embodiment, the rules or a prefix database includes a list of valid prefixes in the local area. In a second pass, the telephone number module 420 examines the <three nos.> portion to determine whether the text string portion contains a valid prefix. If not, then the potential telephone number is determined to not be a telephone number. In another embodiment, the prefix may be indicated with <prefix>.

TABLE 1

| Local telephone number formats | |
|---|---|
| Identifiable Local Telephone Number Format | Format Description - Local Telephone Number Rule |
| 230-5000 | <three nos.><dash><four nos.> |
| 230 5000 | <three nos.><space><four nos.> |
| 230.5000 | <three nos.><period><four nos.> |
| 2305000 | <three nos.><four nos.> |

The set of national telephone number rules 620 determine whether a text string portion under analysis exhibits national telephone number characteristics. Generally, a national telephone number is a sequence of ten or eleven numbers that includes between no and three format characters (not including spaces). In a low tolerance mode, the national telephone number rules 620 are less tolerant of potential telephone numbers that are not entered in a typical format. As a result, the telephone number module 420 returns less false positives. Table 2 lists example telephone number formats acceptable under national telephone rules. The acceptable formats have a maximum of three format characters. High tolerance mode includes and expands acceptable formats under low tolerance mode. However, in other embodiments, more than three format characters are acceptable.

In one embodiment, the national telephone number rules 620 comprises a set of valid national area codes. Accordingly, the first field of <three nos.> is examined to determine if it matches a valid area code. If not, the potential telephone number fails. In another embodiment, the first set of three numbers is represented as <area code>.

In addition to the rule composition above for single format characters, the national telephone rules 620 may comprise a rule composition for multiple format characters. Furthermore, the composition may define the order in which format characters may appear. For example, the rule <three nos.><slash><dash><four nos.> requires that the slash precede the dash.

Additionally, some rules have fields embedded into other fields. For example, for an area code in parentheses, the area code is expressed as an embedded filed, i.e., <parens<area code>>.

TABLE 2

National telephone number formats recognized in low and high tolerance mode

| Identifiable National Telephone Number Format - Low and High Tolerance | Format Description - National Telephone Number Rule |
|---|---|
| (650) 230-5000 | <parens<three nos.>><space><three nos.><dash><four nos.> |
| (650) 230 5000 | <parens<three nos.>><space><three nos.><space><four nos.> |
| 650 230 5000 | <three nos.><space><three nos.><space><four nos.> |
| 650.230.5000 | <three nos.><period><three nos.><period><four nos.> |
| 650/230-5000 | <three nos.><slash><three nos.><dash><four nos.> |
| (650)230-5000 | <parens<three nos.>><three nos.><dash><four nos.> |
| (650) 2305000 | <parens<three nos.>><space><three nos.><four nos.> |
| (650)2305000 | <parens<three nos.>><three nos.><four nos.> |
| +16502305000 | <+1><three nos.><three nos.><four nos.> |
| 16502305000 | <1><three nos.><three nos.><four nos.> |

In a high tolerance mode, the national telephone number rules 620 accept more variations in format. In contrast to the narrow mode, for example, the high tolerance mode allows more combinations of format characters. Table 3 lists example telephone number formats acceptable under national telephone rules in high tolerance mode, in addition to those of Table 2. The acceptable formats have a maximum of three format characters.

TABLE 3

Additional national telephone number formats recognized in high tolerance mode

| Telephone Number Format - High Tolerance | Format Description - National Telephone Number Rule |
|---|---|
| 1 (650) 230-5000 | <1><parens<three nos.>><space><three nos.><dash><four nos.> |
| 1(650) 230-5000 | <1><parens<three nos.>><space><three nos.><dash><four nos.> |
| 1 (650)230-5000 | <1><space><parens<three nos.>><three nos.><dash><four nos.> |
| 1(650)230-5000 | <1><parens<three nos.>><three nos.><dash><four nos.> |
| 1 (650) 2305000 | <1><space><parens<three nos.>><space><three nos.><four nos.> |
| 1(650) 2305000 | <1><parens<three nos.>><space><three nos.><four nos.> |
| 1 (650) 230 5000 | <1><space><parens<three nos.>><space><three nos.><space><four nos.> |
| 1(650) 230 5000 | <1><parens<three nos.>><space><three nos.><space><four nos.> |
| 1 (650)2305000 | <1><space><parens<three nos.>><three nos.><four nos.> |
| 1(650)2305000 | <1><parens<three nos.>><three nos.><four nos.> |
| +1 (650) 230-5000 | <+1><space><parens<three nos.>><space><three nos.><dash><four nos.> |
| +1(650) 230-5000 | <+1><parens<three nos.>><three nos.><dash><four nos.> |
| +1 (650)230-5000 | <+1><space><parens<three nos.>><three nos.><dash><four nos.> |
| +1(650)230-5000 | <+1><parens<three nos.>><three nos.><dash><four nos.> |
| +1(650)2305000 | <+1><parens<three nos.>><three nos.><four nos.> |
| +1(650) 2305000 | <+1><parens<three nos.>><space><three nos.><four nos.> |
| +1 (650) 230 5000 | <+1><space><parens<three nos.>><space><three nos.><space><four nos.> |
| +1(650) 230 5000 | <+1><parens<three nos.>><space><three nos.><space><four nos.> |
| +1 (650)2305000 | <+1><space><parens<three nos.>><three nos.><four nos.> |
| +1(650)2305000 | <+1><parens<three nos.>><three nos.><four nos.> |
| 650-230-5000 | <three nos.><dash><dash><four nos.> |
| 1-650-230-5000 | <1><dash><three nos.><dash><three nos.><dash><four nos.> |
| +1-650-230-5000 | <+1><dash><three nos.><dash><three nos.><dash><four nos.> |
| 1 650-230-5000 | <1><space><three nos.><dash><three nos.><dash><four nos.> |
| +1 650-230-5000 | <+1><space><three nos.><dash><three nos.><dash><four nos.> |
| 1 650 230 5000 | <1><space><three nos.><space><three nos.><space><four nos.> |
| +1 650 230 5000 | <+1><space><three nos.><space><three nos.><space><four nos.> |
| (650) 230-5000 | <parens<three nos.>><space><space><three nos.><dash><four nos.> |
| 650 - 230 - 5000 | <three nos.><space><dash><space><three nos.><space><dash><space><four nos.> |
| 1.650.230.5000 | <1><period><three nos.><period><three nos.><period><four nos.> |
| +1.650.230.5000 | <+1><period><three nos.><period><three nos.><period><four nos.> |

The set of international telephone number rules 540 determine whether a text string portion under analysis exhibits international telephone number characteristics. In one embodiment, the international telephone number rules 540 incorporates a set of valid country codes or international codes. The codes may be predetermined or configured by the user. In one embodiment, the international telephone number rules 540 are subdivided by country. Thus, a field for country is used to determine the applicable rule set, e.g., <UK> or <France>. Table 4 lists example telephone number formats acceptable under international telephone rules.

TABLE 4

International telephone number formats recognized in low and high tolerance mode

| Identifiable International Telephone Number Format - Low and High Tolerance | Format Description - National Telephone Number Rule |
|---|---|
| 07973 946110 | <UK><five nos.><space><six nos.> |
| 0800 3280449 | <UK><four nos.><space><seven nos.> |
| 020 7544 1010 | <UK><three nos.><four nos.><four nos.> |
| (0208)7473871 | <UK><parens<four nos.>><three nos.><four nos.> |

TABLE 4-continued

International telephone number formats
recognized in low and high tolerance mode

| Identifiable International Telephone Number Format - Low and High Tolerance | Format Description - National Telephone Number Rule |
|---|---|
| 0208-7473871 | <UK><four nos.><dash><seven nos.> |
| 020 8747 3871 | <UK><three nos.><space><four nos.><space><four nos.> |
| +44(0)20 87473871 | <+XX><parens<0>><two nos.><space><eight nos.> |
| +44.20.87473871 | <parens<three nos.>><three nos.><four nos.> |
| 01 69 18 82 50 | <France><0X.><space><two nos.><space><two nos.><space><two nos.> |
| 0 820 35 6839 | <France><0><space><three nos.><space><two nos.><space><four nos.> |

Returning to FIG. 5, the non-telephone number module 430 applies a set of non-telephone number rules 530 to determine if the potential telephone number is positively identified as a non-telephone number. Non-telephone numbers are removed from consideration as telephone numbers to reduce false positives. Examples of recognizable number formats that are not telephone numbers include social security numbers, birth dates, some IP and URL addresses, e-mail addresses, etc. For example, an IP address may be identified, for example, when preceded with "http://" or by a distinctive pattern of four numbers ranging from 0 to 255 and separated by periods. A social security number may be recognized by its most likely format, e.g., <three nos.><dash><two nos.><dash><four nos.>. An e-mail address may be identified by including '@', a period, and a top-level domain extension, e.g., <text><@><text><period><<com> OR <net> OR <org> OR <gov>>. A URL address may be recognized by the text sequence 'www', e.g., <space><www.><text><space>. Another rule does not allow a single digit to exist as part of the last seven digits of the telephone number, such as '64236-6421-7.' Methods related to the non-telephone number module 430 are discussed in more detail below.

Advantageously, by removing positively identified non-telephone numbers, the parsing module 252 more accurately determines actual telephone numbers.

Note that the delimiter module 410, the telephone number module 420, and the non-telephone number module 430 refer to the display application's 350 accuracy mode when determining which rules to apply and whether the rules have been satisfied. In one embodiment, the accuracy mode is applied to each module. In another embodiment, the accuracy mode is applied to aggregate results from the modules.

Figure 8:
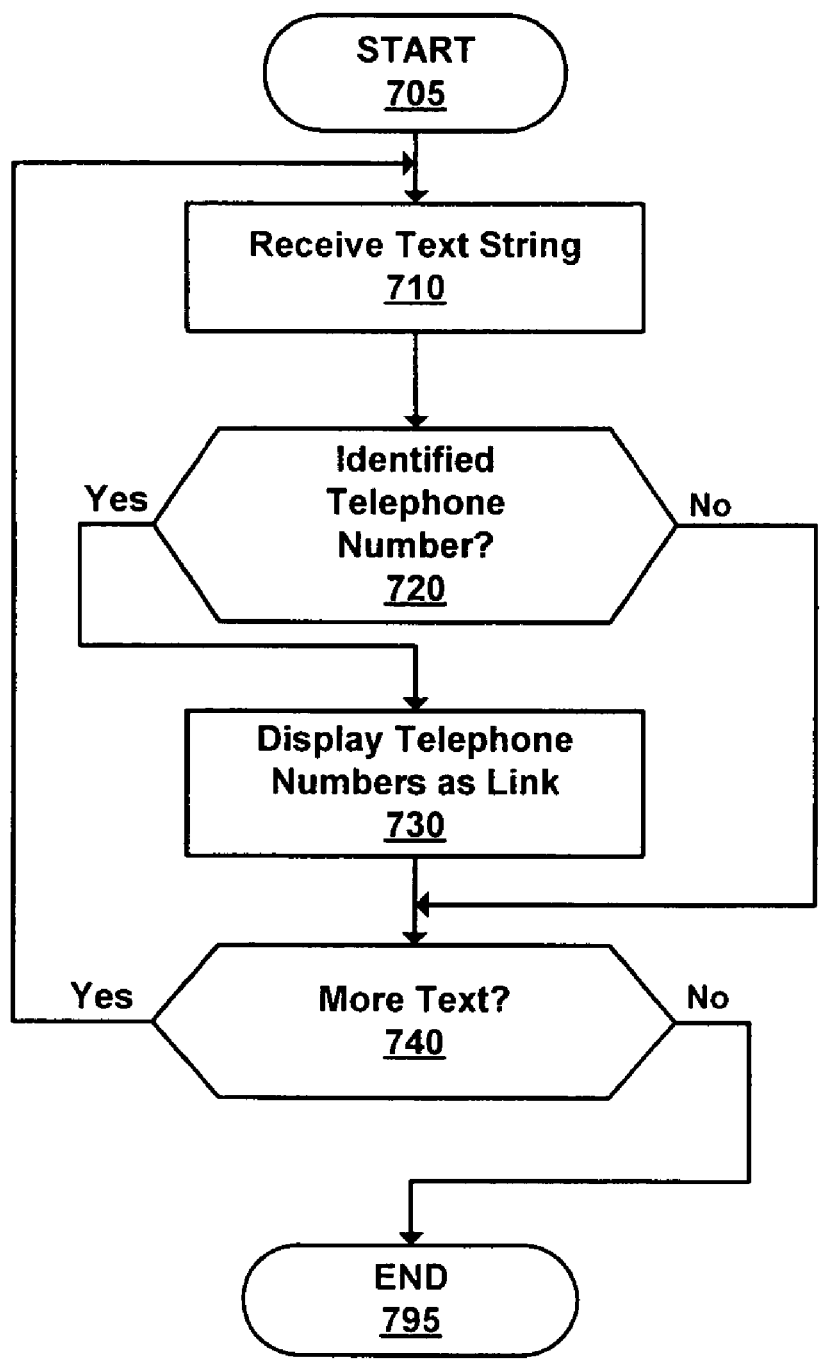
FIG. 8 is a flow chart illustrating a method of displaying a telephone number in a text string according to one embodiment of the present invention.

FIG. 8 is a flow chart illustrating a method of displaying a telephone number in a text string according to one embodiment of the present invention. The process initiates 705 when the display application 350 calls the parsing module 252, to identify telephone numbers in text string. The text buffer 320 receives text strings in the format discussed above in FIG. 1.

The parsing engine 330 uses parsing rules to determine 720 whether any portions of the text string are telephone numbers. In one embodiment, the parsing engine 330 positively identifies telephone numbers. In another embodiment, potential telephone numbers that are not positively identified may be positively identified as non-telephone numbers and output as a telephone number after user verification. In yet another embodiment, the parsing engine 330 qualifies potential telephone numbers that could not be positively identified as either telephone numbers or non-telephone numbers. See FIGS. 9 and 10 and accompanying discussion below for further embodiments.

The display application 350 displays 730 telephone numbers in the user interface with a unique format such as a link, or unique font type, font size, font color, etc. In one embodiment, a cursor changes form when rolling over a telephone number. In yet another embodiment, the presence of telephone numbers is audibly noted. It will be understood by one of ordinary skill of the art that, given the disclosure herein, a variety of formats with in the present invention can be used to indicate that a text string includes a telephone number. The process continues until the text string has been completely analyzed 740.

Figure 9:
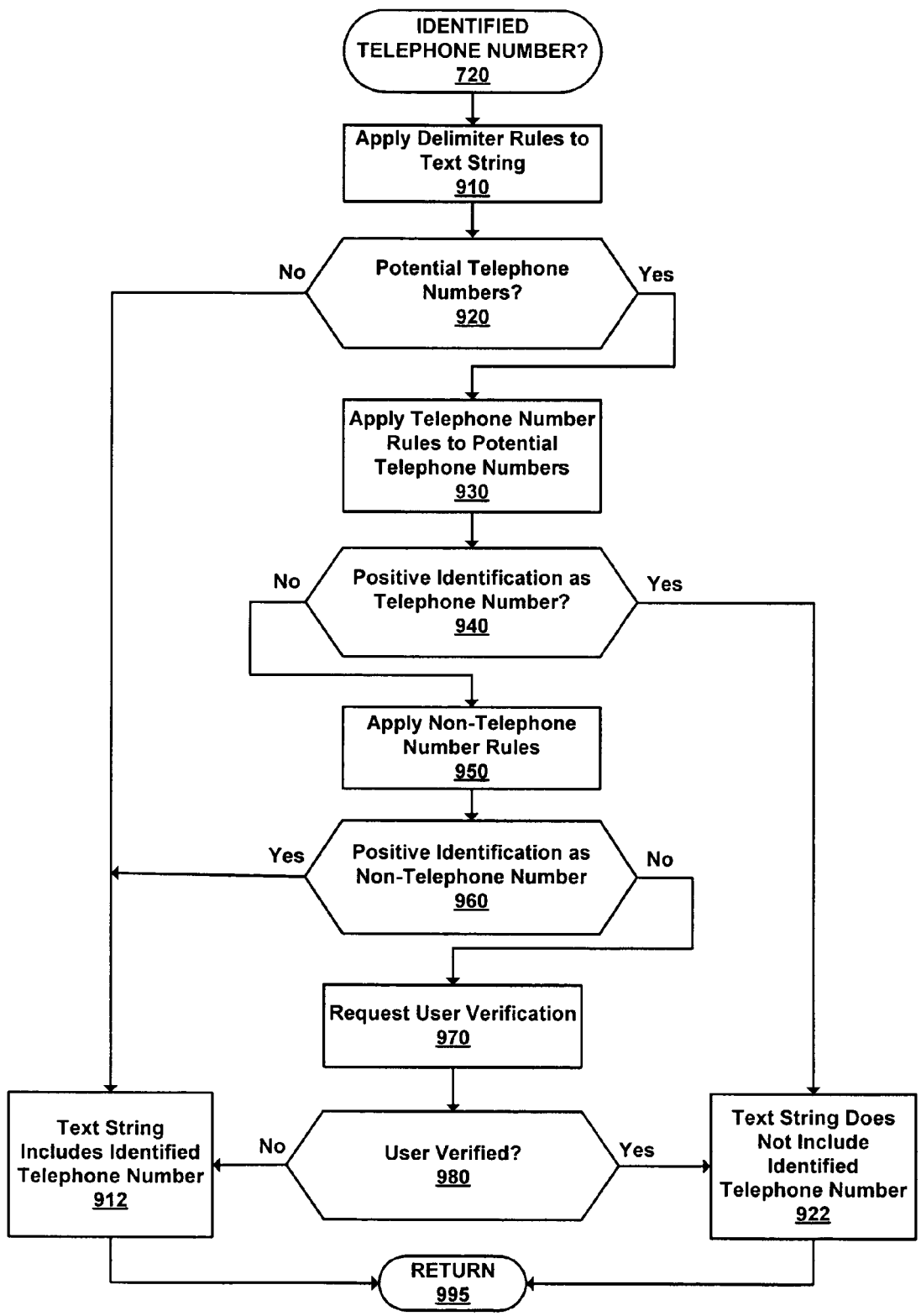
FIG. 9 is a flow chart illustrating the method of identifying a telephone number in a text string according to one embodiment of the present invention.

FIG. 9 is a flow chart illustrating the method 720 of identifying a telephone number in a text string according to one embodiment of the present invention. The delimiter module 410 applies 910 delimiter rules 510 to the text string to determine if potential telephone numbers are present 920. The delimiter module 410 identifies a portion of the text string as a potential telephone number depending on the tolerance mode required by the display application 350. In one embodiment, the tolerance mode may require that the text string portion satisfy each of a subset of threshold rules. In another embodiment, rules are associated with weights and the threshold may require a certain cumulative score. The delimiter module 410 may scan the text string several times, applying different rule sets each time. As shown in FIG. 2, the delimiter module 410 identifies each of the potential telephone number boundaries 1010-1070 having a sequence of numbers separated from the other portions of the text string by a space.

Figure 10:
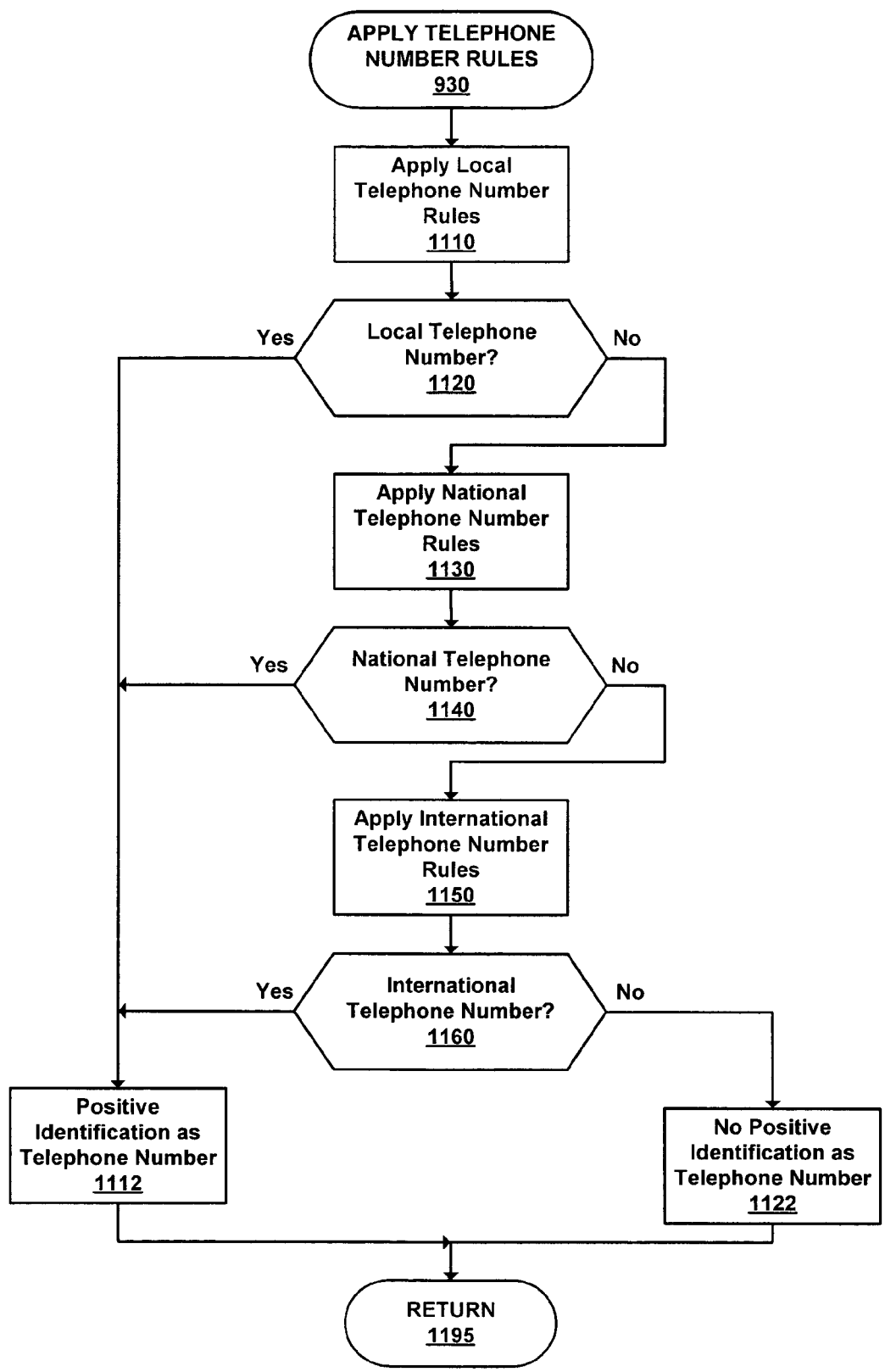
FIG. 10 is a flow chart illustrating the method of applying telephone number rules according to one embodiment of the present invention.

Next for potential telephone numbers, the telephone number module 420 applies 930 telephone number rules 520 to potential telephone numbers. The telephone number module 420 positively identifies telephone numbers as shown in FIG. 10. If there are no potential telephone numbers identified by the delimiter module 410, the text string portion includes no 912 telephone numbers.

For the remaining potential telephone numbers, the non-telephone number module 430 applies 950 non-telephone number rules 530 to positively identify non-telephone numbers. The non-telephone number module 430 may positively identify social security numbers, birth dates, some IP addresses, e-mail addresses, etc. Positively identified non-telephone numbers as discussed with respect to in FIG. 2 are thus not identified 912 as telephone numbers. In another embodiment, the parsing module 252 identifies telephone numbers without eliminating non-telephone numbers.

In a high tolerance mode, the parsing engine 330 may request 970 user verification, for example, by a pop-up box allowing the user to select 'yes' or 'no' to indicate whether the potential telephone number is a telephone number. If the user verifies the telephone number 980, the text string is identified 922 as a telephone number; otherwise, it is not identified 912 as a telephone number. In another embodiment, the parsing module 252 creates a new rule based on the verified telephone number so that future text string portions in the same or similar format are positively identified as a telephone number without requiring user verification.

Advantageously, even if the rules are not determinative, the user may still capture the benefits of telephone number identification.

FIG. 10 is a flow chart illustrating the method 930 of applying telephone number rules according to one embodiment of the present invention. The telephone number module 420 applies 1110 local telephone number rules 610 to determine 1120 if the text string portion is a local telephone number. If so, the text string portion is positively identified 1112 as a telephone number.

If not, the telephone number module 420 applies 1130 national telephone number rules 620 to determine 1140 if the text string is a national telephone number. If so, the text string portion is positively identified 1112.

Last, the telephone number module 420 applies 1150 international telephone number rules 630 to determine 1160 if the text string is an international telephone number. If so, the text string portion is positively identified 1112. However, if not, the text string portion is not identified 1122 as a telephone number.

Figure 11:
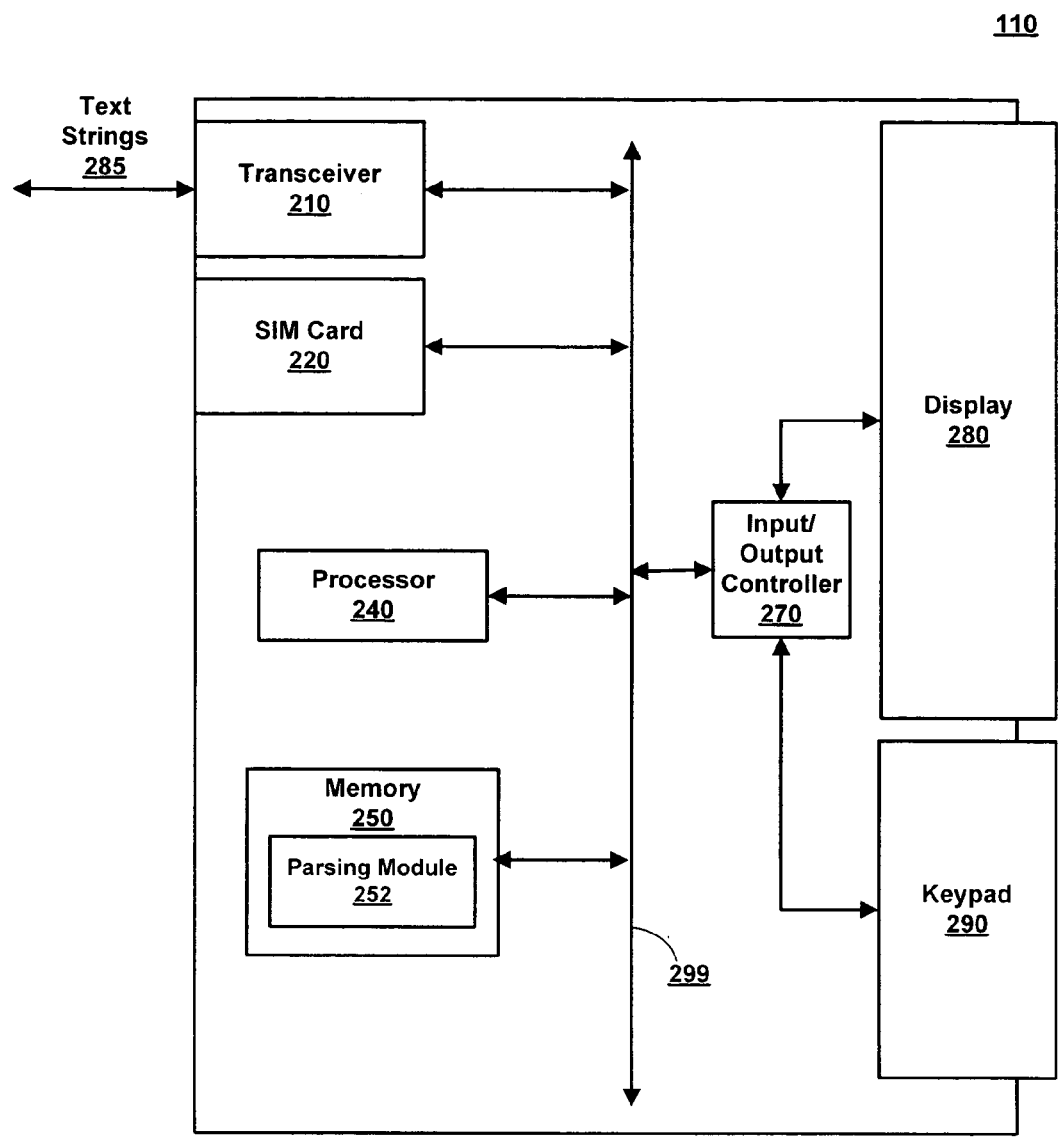
FIG. 11 is a block diagram illustrating the mobile device according to one embodiment of the present invention.

FIG. 11 is a block diagram illustrating the mobile device 110 according to one embodiment of the present invention. One of ordinary skill in the art will recognize that the mobile device 110 is merely illustrative and does not limit the scope of the present invention. The mobile device 110 comprises a transceiver 210, a SIM (Subscriber Identity Module) card 220, a processor 240, an input/output controller 270, and a memory 250 each coupled in communication with a bus 299. In one embodiment, the parsing module 252 is implemented in software stored in memory 250 that executes on the mobile device's 110 hardware.

The transceiver 210 provides the transmission and reception of signals carrying text strings 285 through a carrier frequency. The transceiver 210 may be an RF (Radio Frequency), a Bluetooth, an IEEE 802.11-type, a USB (Universal Serial Bus), an IEEE 1394-type transceiver, or any other transceiver capable of transmitting and receiving signals carrying text strings.

The SIM card 220 provides user account information to log on to and receive signals containing text strings from a network. Responsive to an event such as power-up or reset, the SIM card 220 securely provides user profile information for access to the carrier server. The SIM card 220 may be a compact flash or other type of memory capable of storing a user profile.

The processor 240 executes instructions and manipulates data necessary for the parsing module 252. The processor 240 may be a microprocessor such as an ARM processor by ARM, Inc., a Pentium 4 by Intel Corp. or an Athlon XP by Advanced Micro Devices, an ASIC, a FPD (Field Programmable Device), a microcontroller, or any other device capable of executing instructions and manipulating data.

The input/output controller 270 receives text strings from the keypad 290 and to send to the text string buffer 320 for processing. Additionally, the input/output controller 270 receives processed text strings from the text string buffer 320 to send to the display 280. The input/output controller 270 may further comprise an audio/video interface, interface drivers, a set of input and output buffers, and/or microcode for interrupts. The input/output controller 270 may be implemented in hardware, software, or a combination. The input/output controller 270 may also be capable of servicing other input/output or peripheral devices.

The input/output controller 270 is coupled to a display 280. The display 280 receives, and displays processed video from the input/output controller 270. The display 280 may be a monitor, such as an LCD or plasma type, a television, or any other type of display device capable of displaying message threads. The display 280 may be integrated with the device 110 or separate.

The input/output controller 270 is also coupled to a keypad 290. The keypad 290 receives text strings and control commands from the user and outputs to the input/output controller 270. The keypad 290 may be a 'QWERTY' keyboard, a number pad, a graffiti module, a touch screen, a combination or any other input device capable of receiving user text and commands. The 'QWERTY' keyboard may be mechanically adapted to use on a mobile device. Additionally, they keypad 290 may work in combination with software that provides text shortcuts for faster text entry.

The memory 250 stores the program code executed by the processor, 240 to thread messages such as the parsing module 252 and the operating system. The memory 250 also stores data comprising text strings, such as an e-mail or SMS message, or application data. The memory 250 may be a non-volatile type such as a hard disk, a compact flash, or an EEPROM. The memory 250 may be also be a volatile type such as a random access memory, a buffer, a cache, a register, a combination of non-volatile and volatile memory, or other device capable of storing instructions and data. The memory 250 may also be a single storage device or a system of storage devices. In one embodiment, the memory 250 also includes the parsing module 252.

Figure 12:
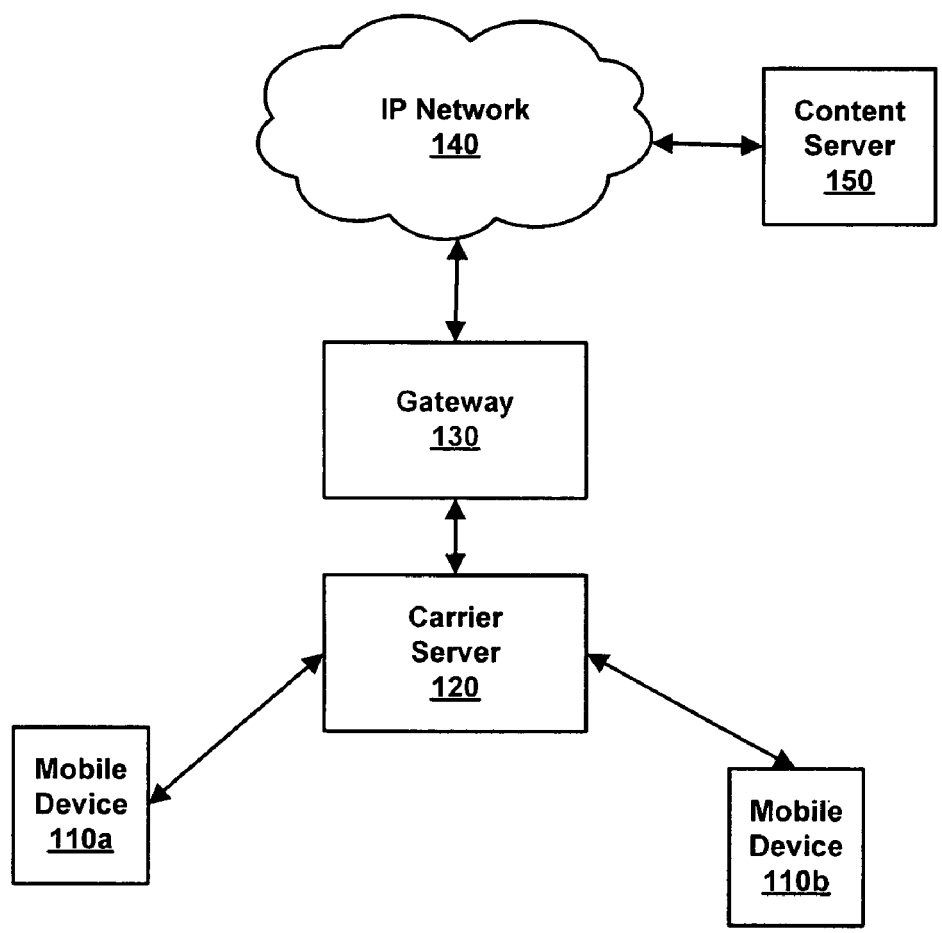
FIG. 12 is a block diagram illustrating a system for transmitting text strings to and between mobile devices.

FIG. 12 is a block diagram illustrating a system for transmitting text strings to and between mobile devices. The system 100 comprises mobile devices 110*a*, 110*b*, a carrier server 120, a gateway 130, an IP network 140, and a content server 150.

The mobile devices 110 receive and display text strings including phone numbers to a user. The mobile devices 110 exchange text strings with each other through the carrier server 120. The mobile devices 110 provide a user interface to output text strings to the user and also to input text strings. The mobile devices 110 may comprise a PDA (Personal Desktop Assistant) such as the Palm Pilot, an IP or cellular telephone, a hybrid PDA/cellular telephone device such as the Treo 600 by Handspring, a PC (Personal Computer), a network appliance, a mobile network device, or any other device capable of displaying text strings with telephone numbers. As such, the mobile device 110 may be dedicated to message communication or integrated into a multi-purpose device. Again, mobile devices are used for illustrative purposes since the present invention may be embodied in non-mobile devices as well.

The carrier server 120 transports messages between mobile devices 110 and other devices such as the content server 150. The carrier server 120 is coupled to mobile devices 110, and thus, can independently service message passing between them. The carrier server is also coupled to the gateway 130 to provide communications with devices on other networks. The carrier server 120 may provide multiple services such as e-mail, voicemail, and the like.

The gateway 130 provides an interface between the carrier server's network and additional transport mediums. In the embodiment of FIG. 12, the gateway 130 is coupled to an IP network 140 to pass messages between a carrier server via a protocol such as GSM, TDMA and the IP protocol. In another embodiment, the gateway 130 may be coupled to a PBX (Private Branch eXchange) to pass messages between the carrier server protocol and a switched telephone network. The gateway 130 may comprise a PC executing server software, a network blade or other device capable of exchanging packets between heterogeneous networks.

The IP network 140 transports data packets between the gateway 130 and the content server 150. The network 140 may be a data network, a telephone network, or any other type of network capable of transporting data. The data may be video, audio, information, or otherwise, carrying digital or analog data. The network 140 can be public or private, include both wired and wireless portions, and send data in packets or through circuits. The network 140 may use communications such as IP or ATM (Asynchronous Transfer Mechanism). Combinations of the previous and variations of network communication are within the scope of the present invention since it is transport independent.

In summary, the present invention identifies and highlights telephone numbers within text strings. The parsing engine 330 analyzes the text string for characteristics of typical telephone number formats. Weighting and/or verification may be used where the parsing engine 330 cannot determinatively qualify or disqualify a portion of the text string as a telephone number. The present invention may be implemented in a text messaging context, or otherwise.

The above description is included to illustrate the operation of the preferred embodiments and is not meant to limit the scope of the invention. The scope of the invention is limited only by the following claims. From the above discussion, many variations will be apparent to one of ordinary skill in the art that would yet be encompassed by the spirit and scope of the invention.

We claim:

1. A method for identifying one or more telephone numbers within a text string, comprising:
   receiving the text string;
   recognizing a portion of the text string less than the entire text string having a potential telephone number;
   identifying the potential telephone number as a telephone number by applying a set of number parsing rules to the portion of the text string, the number parsing rules comprising a set of telephone number rules to identify a telephone number by comparing characteristics of the portion of the text string to one or more formats associated with telephone numbers;
   determining whether the potential telephone number is a telephone number or a non-telephone number, wherein the parsing rules further comprise a set of non-telephone number rules which compare characteristics of the portion of the text string to one or more characteristics associated with non-telephone numbers,
   wherein the set of non-telephone number rules identify a non-telephone number comprising an electronic mail address or a Uniform Resource Locator address;
   displaying, in an SMS (Short Message Service) application, the portion of the text string not including the potential telephone number in a first format;
   displaying a pop-up box including the potential telephone number and requesting user verification of the potential telephone number as a telephone number;
   responsive to receiving user verification of the potential telephone number, identifying the potential telephone number as a telephone number and creating a new telephone number rule based on the user verified telephone number from the pop-up box; and
   displaying, in the SMS application, the telephone number in a second format as a link, wherein the link is activatable to dial the telephone number.

2. The method of claim 1, wherein the telephone number comprises one selected from the group consisting of: a local telephone number, a national telephone number, and an international telephone number.

3. The method of claim 1, wherein the identifying the telephone number comprises:
   identifying the telephone number in a low tolerance mode.

4. The method of claim 1, wherein the identifying the telephone number comprises:
   identifying the telephone number in a high tolerance mode.

5. The method of claim 4, wherein identifying the telephone number in a high tolerance mode comprises:
   identifying the telephone number with high tolerance telephone number rules, wherein the high tolerance telephone number rules allow more format character variations then the telephone number rules.

6. The method of claim 1, wherein the first format comprises a first font and the second format comprises a second font.

7. The method of claim 1, wherein the first format comprises a first color and the second format comprises a second color.

8. The method of claim 1, wherein the link is activatable to store the telephone number in a telephone book.

9. The method of claim 1, wherein the set of telephone rules a sequential relationship between a plurality of format characters.

10. The method of claim 1, wherein at least one parsing rule in the set of parsing rules is based on a plurality of format characters within a single text string.

11. The method of claim 1, wherein the set of telephone number rules comprises at least one from the group consisting of: a local telephone number rule, a national telephone number rule, and an international telephone number rule.

12. A computer-readable storage device having computer program logic embodied thereon for identifying one or more telephone numbers within a text string, comprising:
   receiving a text string;
   recognizing a portion of the text string less than the entire text string having a potential telephone number;
   identifying the potential telephone number as a telephone number by applying a set of number parsing rules to the portion of the text string, the number parsing rules comprising a set of telephone number rules to identify a telephone number by comparing characteristics of the portion of the text string to one or more formats associated with telephone numbers;
   determining whether a potential telephone number is a telephone number or a non-application telephone number, wherein the parsing rules further comprise a set of non-telephone number rules which compare characteristics of the portion of the text string to one or more characteristics associated with non-telephone numbers,
   wherein the set of non-telephone number rules identify a non-telephone number comprising an electronic mail address or a Uniform Resource Locator address;
   displaying, in an SMS (Short Message Service) application, the portion of the text string not including the potential telephone number in a first format;
   displaying a pop-up box including the potential telephone number and requesting user verification of the potential telephone number as a telephone number;
   responsive to receiving user verification of the potential telephone number, identifying the potential telephone number as a telephone number and creating a new telephone number rule based on the user verified telephone number from the pop-up box; and
   displaying, in the SMS application, the telephone number in a second format as a link, wherein the link is activatable to dial the telephone number.

13. The computer product of claim 12, wherein the telephone number comprises one selected from the group consisting of: a local telephone number, a national telephone number, and an international telephone number.

14. The computer product of claim 12, wherein the identifying the telephone number comprises:
   identifying the telephone number in a low tolerance mode.

15. The computer product of claim 12, wherein identifying the telephone number comprises:
identifying the telephone number in a high tolerance mode.

16. The computer product of claim 15, wherein identifying the telephone number in a high tolerance mode comprises:
identifying the telephone number with high tolerance telephone number rules, wherein the high tolerance telephone number rules allow more format character variations then the telephone number rules.

17. The computer product of claim 12, wherein the first format comprises a first font and the second format comprises a second font.

18. The computer product of claim 12, wherein the first format comprises a first color and the second format comprises a second color.

19. The computer product of claim 12, wherein the link is activatable to store the telephone number in a telephone book.

20. The computer product of claim 12, wherein the set of telephone rules a sequential relationship between a plurality of format characters.

21. The computer product of claim 12, wherein at least one parsing rule in the set of number parsing rules is based on a plurality of format characters within a single text string.

22. The computer product of claim 12, wherein the set of telephone number rules comprises at least one from the group consisting of: a local telephone number rule, a national telephone number rule, and an international telephone number rule.

23. A mobile device for identifying telephone numbers in text strings used by applications on the mobile device, the mobile device comprising:
a processor;
a memory coupled to the processor;
a parsing engine stored in the memory and executable by the processor, the parsing engine comprising:
a delimiter module to recognize a portion of the text string less than the entire text string having a potential telephone number;
a telephone number module to identify the potential telephone number as a telephone number by applying a set of number parsing rules to the portion of the text string, the number parsing rules comprising a set of telephone number rules to identify a telephone number by comparing characteristics of the portion of the text string to one or more formats associated with telephone numbers; and
a non-telephone number module to identify the potential telephone number as a non-telephone number by applying the number parsing rules, the number parsing rules further comprising a set of non-telephone number rules to identify a non-telephone number which compare characteristics of the portion of the text string to one or more characteristics associated with non-telephone numbers, the non-telephone number comprising an electronic mail address or a Uniform Resource Locator address; and
a plurality of applications stored in the memory and executable by the processor, each application configured to provide a text string to the parsing engine and in response receive an identified telephone number within the text string from the parsing engine, each application further configured to display the identified telephone number in a first format and a portion of the text string not including the identified telephone number in a second format different from the first format;
displaying a pop-up box including the potential telephone number and requesting user verification of the potential telephone number as a telephone number;
responsive to receiving user verification of the potential telephone number, identifying the potential telephone number as a telephone number and creating a new telephone number rule based on the user verified telephone number from the pop-up box; and displaying the second format as a link, wherein the link is activatable to dial the telephone number.

24. The mobile device of claim 23, wherein the telephone number comprises one selected from the group consisting of: a local telephone number, a national telephone number, and an international telephone number.

25. The mobile device of claim 23, wherein the telephone number module identifies a telephone number in a low tolerance mode.

26. The mobile device of claim 23, wherein the telephone number module identifies a telephone number in a high tolerance mode.

27. The mobile device of claim 23, wherein the first format comprises a first font and the second format comprises a second font.

28. The mobile device of claim 23, wherein the first format comprises a first color and the second format comprises a second color.

29. The mobile device of claim 23, wherein the link is activatable to store the telephone number in a telephone book.

30. The mobile device of claim 23, wherein one of the plurality of applications comprises a web browser.

31. The mobile device of claim 23, wherein one of the plurality of applications comprises SMS (Short Message Service) application.

32. The mobile device of claim 23, wherein the set of telephone rules a sequential relationship between a plurality of format characters.

33. The mobile device of claim 23, wherein at least one parsing rule in the set of number parsing rules is based on a plurality of format characters within a single text string.

34. The mobile device of claim 23, wherein the set of telephone number rules comprises at least one from the group consisting of: a local telephone number rule, a national telephone number rule, and an international telephone number rule.

35. The mobile device of claim 23, wherein the delimiter module receives the text string from a text buffer.

36. The method of claim 1, wherein the set of non-telephone number rules further identify a non-telephone number comprising a date.

37. The method of claim 1, wherein the set of non-telephone number rules further identifier a non-telephone number comprising an Internet Protocol address or a social security number.

38. The computer-readable storage device of claim 12, wherein the set of non-telephone number rules further identify a non-telephone number comprising a date.

39. The computer-readable storage device of claim 12, wherein the set of non-telephone number rules further identifier a non-telephone number comprising an Internet Protocol address or a social security number.

40. The mobile device of claim 23, wherein the set of non-telephone number rules further identify a non-telephone number comprising a date.

41. The mobile device of claim 23, wherein the set of non-telephone number rules further identifier a non-telephone number comprising an Internet Protocol address or a social security number.

* * * * *

UNITED STATES PATENT AND TRADEMARK OFFICE
CERTIFICATE OF CORRECTION

| | | |
|---|---|---|
| PATENT NO. | : 7,835,504 B1 | Page 1 of 1 |
| APPLICATION NO. | : 10/701937 | |
| DATED | : November 16, 2010 | |
| INVENTOR(S) | : Richard J. Donald et al. | |

It is certified that error appears in the above-identified patent and that said Letters Patent is hereby corrected as shown below:

Col. 14, line 38, replace "non-application telephone" with --non-telephone--.

Signed and Sealed this
Fourteenth Day of June, 2011

David J. Kappos
*Director of the United States Patent and Trademark Office*